United States Patent [19]

Suzuki et al.

[11] 4,229,498
[45] Oct. 21, 1980

[54] LIGHT-POLARIZING FILM

[75] Inventors: Hajime Suzuki; Hiroyuki Hamada; Rinjiro Ichikawa, all of Otsu, Japan

[73] Assignee: Toyo Boseki Kabushiki Kaisha, Japan

[21] Appl. No.: 25,233

[22] Filed: Mar. 29, 1979

[51] Int. Cl.$^2$ .................. B32B 27/32; G02F 1/17; G02B 5/30
[52] U.S. Cl. .................. 428/212; 350/149; 350/155; 428/412; 428/414; 428/415; 428/442; 428/518; 428/519; 428/520; 428/910; 428/913; 428/510; 525/192; 525/203; 525/206; 525/213; 525/227; 252/300
[58] Field of Search ............. 428/412, 414, 424, 442, 428/518, 520, 913, 910, 415, 519, 510, 212; 525/192, 213, 203, 206, 227; 350/149, 155

[56] References Cited

U.S. PATENT DOCUMENTS

| | | | |
|---|---|---|---|
| 3,621,085 | 11/1971 | Ichikawa | 526/17 X |
| 3,804,705 | 4/1974 | Kishikawa et al. | 428/518 X |
| 3,908,052 | 9/1975 | Sanders | 428/1 |
| 3,941,901 | 3/1976 | Harsch | 428/1 |
| 4,058,649 | 11/1977 | Steiner | 428/518 |

*Primary Examiner*—Ellis P. Robinson
*Attorney, Agent, or Firm*—Jones, Tullar & Cooper

[57] ABSTRACT

A light-polarizing film comprising a polymer mixture containing a polymer having polyene chains formed by partial dehydrohalogenation of a halogenated vinyl polymer or a halogenated vinylidene polymer and one or more of the polymers selected from the group consisting of acrylate polymers and methacrylate polymers. Said light-polarizing film has excellent heat stability as well as humidity resistance and is useful in various fields including liquid crystal device, optical device, etc.

14 Claims, No Drawings

LIGHT-POLARIZING FILM

The present invention relates to a light-polarizing film having excellent heat stability and humidity resistance.

A conventional light-polarizing film is produced by impregnating a film of polyvinyl alcohol (hereinafter referred to as PVA) or its derivative with an aqueous solution of iodine or a dichromic dye and then stretching the film by dry or wet heating so that high molecular micelles are unidirectionally oriented. However, since PVA used as the base material is a hydrophilic polymer, the light-polarizing film thus obtained lacks humidity resistance.

We have previously developed a process for producing a hydrophobic light-polarizing film so as to improve humidity resistance of a light-polarizing film (e.g. U.S. Pat. No. 3,621,085). In this process, a halogenated vinyl polymer or a halogenated vinylidene polymer is reacted with a dehydrohalogenating agent to form polyene chains (conjugated double bonds) in the molecule and the polyene chains are unidirectionally oriented in the film of the polymer to obtain a light-polarizing film.

However, with respect to heat stability, these conventional light-polarizing films including our hydrophobic film, above, are still deficient. For example, generally, a light-polarizing film having a PVA base material should be used at a temperature of not more than 40° C. for long time use and at the most at 60° C. for short time use. When our previously developed hydrophobic light-polarizing film of a halogenated vinyl polymer containing polyene chains is employed as a light-polarizing element, the film changes color and darkens to reduce light transmittance when it is continuously used at 60° C. for a long time (e.g. for several days).

Accordingly, the use of light-polarizing films has hitherto been limited due to such the drawbacks and it has been required in various fields of arts to improve heat resistance of light-polarizing films. Particularly, in the field of liquid crystal display wherein light-polarizing films are expected to expand their use, it is required that the light-polarizing films have a high stability to dry and wet heating sufficient to allow continuous use at 60° to 70° C. for a long time.

We have intensively studied the improvement of the light-polarizing film so as to satisfy these requirements and have found that the heat stability of a light-polarizing film can be remarkably improved while maintaining excellent humidity resistance and polarization efficiency by homogeneously distributing an acrylate and/or methacrylate polymer in a conventional polyene-containing light-polarizing film.

The main object of the present invention is to provide a light-polarizing film having improved heat resistance and stability as well as excellent humidity resistance and excellent polarization efficiency. Another object of the present invention is to provide a light-polarizing film suitable for various uses. Other objects and advantages of the present invention will be apparent from the following description.

According to the present invention, the above objects and others are generally accomplished by providing a light-polarizing film which comprises a polymer mixture containing a polymer having polyene chains formed by partial dehydrohalogenation of a halogenated vinyl polymer or a halogenated vinylidene polymer and one or more of the polymers selected form the group consisting of acrylate polymers and methacrylate polymers.

The light-polarizing film of the present invention can be produced by various processes.

For example, the light-polarizing film of the present invention can be produced by substantially the same process for producing a known polyene-containing light-polarizing film. In the light-polarizing film of the present invention, an acrylate and/or methacrylate polymer is merely homogeneously distributed in the conventional film which displays the polarization efficiency by unidirectional orientation of a polymer having polyene chains. That is, the light-polarizing film of the present invention can be produced by homogeneously admixing an acrylate polymer or a methacrylate polymer with all the other components of the film and with any other film-forming polymers at any stage of a process for producing a conventional polyene-containing film which comprises partially dehydrohalogenating a halogenated vinyl polymer or a halogenated vinylidene polymer to form polyene chains in the molecule thereof and then unidirectionally orienting the polyene chains in the film of the polymer having the polyene chains.

The formation of polyene chains can be carried out in one step or in two steps but, preferably, in the present invention, it is carried out in two steps. Firstly, a halogenated vinyl polymer or a halogenated vinylidene polymer is partially dehydrohalogenated with a dehydrohalogenating agent to form polyene chains. The polymer is subjected to the dehydrohalogenation in the form of a solution or solid such as a suspension or film. Then, the dehydrohalogenated product is further dehydrohalogenated by heating to grow the polyene chains in the molecule of the polymer.

For example, the light-polarizing film of the present invention can be produced by reacting a halogenated vinyl polymer or a halogenated vinylidene polymer with a dehydrohalogenating agent in a solvent after or before addition thereto an acrylate polymer or a methacrylate polymer and, if necessary, one or more of other polymers until the dehydrohalogenation degree (i.e. the ratio of halogen atoms removed as hydrogen halide to total halogen atoms in the polymer used) reaches 0.1 to 20 mol%, casting the solution thus obtained into a film, heating the film preferably at 70° to 150° C. to grow the polyene chains and then unidirectionally orienting the resulting polyene-containing film.

Alternatively, the light-polarizing film of the present invention can be produced by admixing an acrylate polymer or a methacrylate polymer with a halogenated vinyl polymer or a halogenated vinylidene polymer, forming the mixture into a film of 5 to 500μ in thickness by a usual method such as calendering, extruding or casting, reacting the film with a dehydrohalogenating agent in a non-solvent or a swelling agent for the film to obtain a yellowish film, removing the dehydrohalogenating agent by washing, heating the film at 70° to 150° C. to grow polyene chains formed therein and then stretching the film in one direction.

Preferably, the light-polarizing film of the present invention has 10 to 70%, more preferably 20 to 70%, of average light transmittance at the wavelength of 450 to 700 mμ (average of light transmittance measured within the wavelength range at intervals of 10 m μ) and the ratio of average percent light transmitted with the polarization axes parallel ($H_0$) to average percent light transmitted with the polarization axes crossed ($H_{90}$) thereof is $H_0/H_{90} \geq 2$, more preferably, $H_0/H_{90} \geq 4$.

When the above light transmittance is too low, brightness of the film is insufficient. To the contrary, when the above light transmittance is too high, polarization efficiency of the film is insufficient. Further, when $H_0/H_{90}$ ratio is too low, a sufficient contrast can not be obtained and it causes insufficient difference between a bright part and a dark part when the film is used in a liquid crystal display device. Generally, when a value of percent light transmitted with the polarization axes parallel (light transmittance of two films as overlapped in the parallel position in respect of polarization axes) and a value of percent light transmitted with the polarization axes crossed (light transmittance of two films as overlapped in the rectangular position in respect of polarization axes) are used as a mesure of polarization efficiency of a light-polarizing film and the ratio or difference of these two values is larger, the difference of the contrast of bright and dark between two films as overlapped in the parallel position and in the rectangular position in respect of polarization axes is larger. Usually, corresponding to the above average light transmittance, $H_0$ and $H_{90}$ to the wavelength of 450 to 700 m$\mu$ of the light-polarizing film of the present invention are 10 to 55%, preferably 25 to 45%, and 0.01 to 45%, preferably 0.01 to 20%, respectively.

The thickness of the light-polarizing film of the present invention is not critical but usually, it is 1 to 200$\mu$, preferably 5 to 50$\mu$.

The acrylate or methacrylate polymer used in the present invention is a homopolymer or a copolymer of a monomer of the formula:

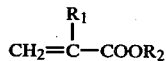  (I)

in which $R_1$ is hydrogen or an alkyl having 1 to 10 carbon atom (preferably hydrogen or methyl); and $R_2$ is an alkyl having 1 to 10 carbon atoms, a cycloalkyl or bicycloalkyl having 5 to 10 carbon atoms (e.g., cyclohexyl, isomenthyl, isobornyl, etc.), an aryl having 6 to 10 carbon atoms (e.g. phenyl, naphthyl, etc.), an aralkyl having 7 to 10 carbon atoms (e.g. benzyl, p-isopropylbenzyl etc.) or a heterocyclic group containing one or more hetero atoms selected from O, N and S (e.g. furfuryl, thienyl etc.) and the alkyl chain of the group $R_2$ may be interrupted with O, N or S and the alkyl or aryl group may be substituted with one or more halogens (e.g. bromine, etc.). Further, the acrylate or methacrylate polymer includes a copolymer of the above monomer (I) and up to 50 mol% (based on all the structural units of the polymer) of another copolymerizable monomer of the formula:

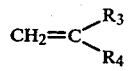  (II)

in which $R_3$ is hydrogen or alkyl having 1 to 10 carbon atoms (preferably, hydrogen or methyl); and $R_4$ is a hydrocarbon group having 1 to 10 carbon atoms such as an alkyl having 1 to 10 carbon atoms, an aryl having 6 to 10 carbon atoms (e.g. phenyl, naphthyl, etc.), or a cycloalkyl or bicycloalkyl having 5 to 10 carbon atoms (e.g. cyclohexyl, etc.), a heterocyclic group having one or more hetero atoms selected from O, N and S (e.g. furfuryl, thienyl etc.), —CN, —OH or —OOCR$_5$; R$_5$ is an alkyl having 1 to 10 carbon atoms and the alkyl chain of the groups $R_4$ and $R_5$ may be interrupted with O, N, S, or —COO— and the group $R_4$ may be substituted with one or more OH or halogens (e.g. bromine, etc.). Examples of the acrylate or methacrylate polymer are homopolymers such as polymethyl methacrylate, polyethyl methacrylate, polypropyl methacrylate, polymethyl acrylate, polyethyl acrylate and the like; bipolymers such as methyl methacrylate-ethyl methacrylate copolymer, methyl methacrylate-propyl methacrylate copolymer, methyl methacrylate-butyl methacrylate copolymer, ethyl methacrylate-propyl methacrylate copolymer, methyl methacrylate-methyl acrylate copolymer, ethyl methacrylate-methyl acrylate copolymer, methyl methacrylate-ethyl acrylate copolymer, methyl acrylate-methyltriglycol acrylate copolymer, methyl methacrylate-methyltriglycol acrylate copolymer, methyl methacrylate-stearyl acrylate copolymer, methyl methacrylate-stearyl methacrylate copolymer, ethyl methacrylate-ethy acrylate copolymer, methyl methacrylate-butyl acrylate copolymer, methyl methacrylate-propyl acrylate copolymer, methyl methacrylate-2-hydroxyethyl methacrylate copolymer, methyl methacrylate-2-hydroxypropyl methacrylate copolymer, ethyl methacrylate-2-hydroxyethyl methacrylate copolymer, ethyl methacrylate-2-hydroxypropyl methacrylate copolymer, methyl ethacrylate-2-hydroxyethyl acrylate copolymer, methyl methacrylate-2-hydroxypropyl acrylate copolymer, ethyl methacrylate-2-hydroxyethyl acrylate copolymer, ethyl methacrylate-2-hydroxypropyl acrylate copolymer, methyl methacrylate-tetrahydrofurfuryl acrylate copolymer, methyl methacrylate-tetrahydrofurfuryl methacrylate copolymer, ethyl methacrylate-tetrahydrofurfuryl acrylate copolymer, ethyl methacrylate tetrahydrofurfuryl methacrylate copolymer, methyl methacrylate-benzyl acrylate copolymer, methyl methacrylate-benzyl methacrylate copolymer, methyl methacrylate-benzyl acrylate copolymer, methyl methacrylate-phenoxyethyl acrylate copolymer, methyl methacrylate-phenoxyethyl methacrylate copolymer, methyl methacrylate-cyclohexyl acrylate copolymer, methyl methacrylate-cyclohexyl methacrylate copolymer, methyl methacrylate-glycidyl acrylate copolymer, methyl methacrylate-glycidyl methacrylate copolymer, ethyl methacrylate-tribromophenyl acrylate copolymer methyl methacrylate-dibromopropyl acrylate copolymer, methyl methacrylate-tropine acrylate copolymer, methyl methacrylate-tropine methacrylate copolymer, methyl acrylate-tropine methacrylate copolymer, ethyl methacrylate-tropine acrylate copolymer, methyl methacrylate-isobornyl methacrylate copolymer, methyl methacrylate-isobornyl acrylate copolymer, ethyl methacrylate-isobornyl methacrylate copolymer, propyl methacrylate-isobornyl methacrylate copolymer, methyl methacrylate-isomenthyl acrylate copolymer, metyl methacrylate-isomenthyl methacrylate copolymer, ethyl methacrylate-isomenthyl methacrylate copolymer, methyl acrylate-acrylonitrile copolymer, butyl acrylate-acrylonitrile copolymer, n-propyl acrylate-acrylonitrile copolymer and the like; and terpolymers such as methyl methacrylate-ethyl methacrylate-butyl methacrylate copolymer, methyl methacrylate-ethyl methacrylate-methyl acrylate copolymer, methyl methacrylate-ethyl methacrylate-methyltriglycol acrylate copolymer, methyl methacrylate-ethyl methacrylate-stearyl acrylate copolymer, methyl methacrylate-ethyl methacrylate-stearyl methacrylate copolymer, methyl methacrylate-ethyl methacrylate-tetrahydrofurfuryl acrylate copolymer, methyl methacrylate-ethyl methacrylate-tetrahydrofurfuryl methacrylate copolymer, methyl methacrylate-ethyl methacrylate-benzyl acrylate copolymer, methyl methacrylate-ethyl methacrylate-benzyl methacrylate copolymer, methyl methacrylate-ethyl methacrylate-phenoxyethyl acrylate copolymer, methyl methacrylate-ethyl methacrylate-phenoxyethyl methacrylate copolymer, methyl methacrylate-ethyl methacrylate-cyclohexyl acrylate copolymer, methyl methacrylate-ethyl methacrylate-cyclohexyl methacrylate copolymer, methyl methacrylate-ethyl methacrylate-glycidyl acrylate copolymer, methyl methacrylate-ethyl methacrylate-glycidyl methacrylate copolymer, methy methacrylate-ethyl methacrylate-tribromophenyl acrylate copolymer, methyl methacrylate-ethyl methacrylate-tribromophenyl methacrylate copolymer, methyl methacrylate-ethyl methacrylate-dibromophenyl methacrylate copolymer, methyl methacrylate-methyl acrylate-benzyl methacrylate copolymer, methyl methacrylate-methyl acrylate-cyclohexyl acrylate copolymer, methyl methacrylate-methyl acrylate-glycidyl methacrylate copolymer, methyl methacrylate-methyl acrylate-tribromophenyl methacrylate copolymer and the like. These polymers can be used alone or in a combination thereof. Preferably, the acrylate or methacrylate polymer is used in an amount of 5 to 95% by weight, more preferably 5 to 35% by weight, based on the total weight of the halogenated vinyl or vinylidene polymer used for the formation of polyene chains. When the amount of the polymer is less than 5% by weight, improvement of heat stability of the resulting light-polarizing film is insufficient. On the other hand, when the amount of the polymer is more than 95% by weight, the polyene concentration in the molecule is insufficient and polarization efficiency is lowered.

The halogenated vinyl or vinylidene polymer used for the formation of polyene chains is a homopolymer or a copolymer of a monomer of the formula:

(III)

in which X is halogen (preferably, chlorine or bromine); $R_6$ is hydrogen, —CN, —COOR$_7$, —OOCR$_8$ or an aryl having 6 to 10 carbon atoms (e.g. phenyl, naphthyl, etc.); $R_7$ is an alkyl having 1 to 10 carbon atoms; and $R_8$ is an alkyl having 1 to 10 carbon atoms, an aryl having 6 to 10 carbon atoms (e.g. phenyl, naphthyl, etc.) or a cycloalkyl having 5 to 10 carbon atoms (e.g. cyclohexyl, etc.). Typical examples of these polymers are a homopolymer or a copolymer of a vinyl halide and/or a vinylidene halide such as vinyl chloride, vinyl bromide, vinylidene chloride and the like. Further, the halogenated vinyl or vinylidene polymer includes a copolymer of the above monomer (III) and up to 90 mol% (based on all the structural units of the polymer) of another copolymerizable monomer, preferably, a monomer of the formula:

(IV)

in which $R_9$ is hydrogen or an alkyl having 1 to 10 carbon atoms; $R_{10}$ is hydrogen, a hydrocarbon group having 1 to 10 carbon atoms such as an alkyl having 1 to 10 carbon atoms, an aryl having 6 to 10 carbon atoms (e.g. phenyl, naphthyl, etc.) or a cycloalkyl having 5 to 10 carbon atoms (e.g. cyclohexyl, etc.), a heterocyclic group having one or more hetero atoms selected from O, N and S (e.g. furfuryl, thienyl etc.), —CN, —COOR$_{11}$, —OOCR$_{12}$ or —OH; $R_{11}$ is hydrogen or an alkyl having 1 to 10 carbon atoms; $R_{12}$ is an alkyl having 1 to 10 carbon atoms, an aryl having 6 to 10 carbon atoms (e.g. phenyl, naphthyl, etc.), or a cycloalkyl having 5 to 10 carbon atoms (e.g. cyclohexyl etc.) and the alkyl chain of the groups $R_{11}$ and $R_{12}$ may be interrupted with O, N or S and the hydrocarbon group of $R_{10}$ may be substituted with one or more halogens. In case of using a copolymer of a vinyl halide and a vinylidene halide and/or one or more other copolymerizable monomers, it must be a block copolymer or a graft copolymer so as to form polyene chains having sufficient chain length and it is preferable that the average chain length (polymerization degree) of a polyvinyl halide block or a polyvinylidene halide block in the copolymer is more than 20. When the chain length is less than 20, it is difficult to obtain light-polarizing elements having enough activity within the visible light range. Further, it is preferable that the molar ratio of a vinyl halide or a vinylidene halide to all structural units of the polymer is 0.1/1 to 1/1, more preferably 0.5/1 to 1/1.

Examples of the usable block copolymer are as follows (they are shown by monomer structural units wherein "VC" and "VB" stand for vinyl chloride and vinyl bromide, respectively):

VC-vinyl acetate, VC-acrylonitrile, VC-ethylene, VC-propylene, VC-styrene, VC-butadiene, VC-isoprene, VC-vinylidene chloride, VC-acrylic acid, VC-methyl acrylate, VC-methyl methacrylate, VC-ethylene trifluoride, VB-vinyl acetate, VB-acrylonitrile, VB-ethylene, VB-propylene, VB-vinylidene chloride, VB-styrene, VB-acrylic acid, VB-methyl acrylate, VB-methyl methacrylate, VC-vinyl acetate-vinyl alcohol, VC-vinylidene chloride-methyl acrylate, VC-vinyl fluoride-ethylene tetrafluoride, VB-styrene-methyl acrylate, α-chlorovinylbenzene-vinylbenzene, α-chloroacrylonitrile-acrylonitrile, α-chloroacrylonitrile-methacrylic acid. Suitable examples of the graft copolymer are polyvinyl chloride graft-copolymerized with methyl methacrylate or styrene, polyvinyl bromide graft-copolymerized with styrene and the like.

These polymers or copolymers capable of formation of polyene chains can be used alone or in a combination thereof.

The light-polarizing film of the present invention contains 5 to 95% by weight of the acrylate or methacrylate polymer and 5 to 95% by weight of the partially dehydrohalogenated halogenated vinyl or vinylidene polymer.

If desired, one or more of other film-forming polymers can be presented in the light-polarizing film of the present invention together with the polymer having polyene chains and the acrylate or methacrylate polymer. Examples of these polymers are polyvinyl chloride, vinyl chloride-vinyl acetate copolymer, vinyl chloride-vinyl acetate-vinyl alcohol copolymer, vinyl acetate-vinyl alcohol copolymer.

As described above, the formation of polyene chains can be carried out in one step with a dehydrohalogenating agent alone or in two steps with a dehydrohalogenating agent and then a heat treatment.

The dehydrohalogenating agent used in the present invention is, for exaple, a secondary or tertiary amine such as triethylamine, tri-n-propylamine, tri-n-butylamine, tri-n-amylamine, triethylenediamine, diethylamine, di-n-propylamine and di-n-butylamine; an alkali metal alcoholate such as sodium methylate and sodium ethylate; an amidine compound such as 1,8-diazabicyclo[5.4.0]undecene-7 and 1,5-diazabicyclo[4.3.0]nonene-5 and the like.

Although the preferred amount of the dehydrohalogenating agent depends upon the content of the partially dehydrohalogenated halogenated vinyl or vinylidene polymer and other polymer in the film, it is desirable to use more than 0.1 part by weight of the dehydrohalogenating agent per 100 parts by weight of the halogenated vinyl or vinylidene polymer. When the amount of the dehydrohalogenating agent is less than 0.1 part by weight, the reaction rate is extremely low.

The dehydrogenation can be carried out in respect of the polymer in the form of a solution or solid as described above.

The solvent which dissolves the polymer to be used and the dehydrohalogenating agent and is suitable for carrying out the dehydrohalogenation is, for example, dimethylformamide, diethylformamide, dimethyl sulfoxide, tetrahydrofuran, dioxane, methyl ethyl ketone, a mixture thereof and the like.

When the dehydrohalogenation is carried out in the form of a solution, the dehydrohalogenating agent is added to the polymer dissolved in the above solvent in an amount of 0.00001 to 1 mol%, preferably 0.00002 to 0.4 mol%, based on the amount of the vinyl halide or vinylidene halide units in the polymer to be used.

When the dehydrohalogenation is carried out in the form of solid such as a film, the material to be dehydrohalogenated is treated with a solution of the dehydrohalogenating agent (concentration: 1 to 50% by weight) in a good solvent thereof which does not dissolve the material (usually, n-hexane, n-heptane, isopropyl ether and the like can be used).

In case of forming polyene chains in two steps, the treatment with the dehydrohalogenating agent is carried out at 5° to 150° C., preferably at 20° to 100° C., until the dehydrohalogenation degree reaches 0.1 to 20 mol%, preferably 0.2 to 10 mol%. The dehydrohalogenation degree can be calculated by change of halogen content of the polymer used but the progress of the dehydrohalogenation can also be fairly exactly checked by color change of the polymer or a solution thereof. That is, when the dehydrohalogenation is adequately carried out, the product has yellow color whereas the product becomes orange, red or black when excess dehydrohalogenation is taken place. Accordingly, the time when the reaction should be stopped can be usually decided by monitoring the change of the visible light transmittance curve of the reaction mixture to check the progress of the reaction (light absorption is initially observed at near UV range and gradually appeared at a long wavelength range).

In the molecule of the polymer thus partially dehydrohalogenated by the dehydrohalogenating agent, double bonds are distributed at random and polyene chains having short chain length are also partially formed. When the polymer is subsequently treated by heating, the growth of the polyene chains are initiated at these double bonds.

The heat treatment of the above dehydrohalogenated product is carried out in the air or in an inert gas such as nitrogen at 50° to 150° C., preferably at 60° to 130° C., under atmospheric pressure or a reduced pressure.

In the heat treatment, the polyene chains grow with the progress of the treatment since the reaction is a chain reaction initiated at the double bonds which have already been presented in the molecule of the polymer. With growth of the polyene chains, light absorption of the reaction product within the visible light range increases and color thereof changes into blue via violet.

When the reaction mixture is colored toward blue, its visible light transmittance curve shows a maximum absorption at wavelength of 565 to 600 m$\mu$. Therefore, the heat treatment is terminated when a maximum absorption of the reaction mixture is observed within or at least around the above wavelength and the light transmittance thereof at the wavelength of the maximum absorption reaches 0.001 to 60%, preferably 0.01 to 45%. At this stage, 10 to 25 double bonds are linked in the polyene chains.

The heat treatment time necessary for the formation of polyene chains having suffifient length varies with the dehydrohalogenation degree (in the above treatment with the dehydrohalogenating agent) and other conditions but, usually, it is in the range of 2 minutes to 20 hours.

In any process, the polymer is dehydrohalogenated until the dehydrohalogenation degree finally reaches 0.1 to 30 mol%, usually 0.5 to 20 mol%.

After the dehydrohalogenation, the polyene chains formed in the polyvinyl or vinylidene halide are unidirectionally oriented by stretching a film formed from a polymer mixture comprising as main compounds the polymer having polyene chains and the acrylate or methacrylate polymer. The stretching is carried out, for example, at 80° to 150° C., preferably at 85° to 140° C., when polyvinyl chloride is used as the halogenated vinyl polymer. The film is stretched in the stretching ratio of more than 1.2 times the length without break, preferably 2 to 8.5 times. Optionally, the film may be also stretched in a direction at right angle to the above stretching direction in the stretching ratio of about 1.1 to 2 times the length after, before or at the same time of the above stretching in order to improve mechanical properties of the film.

The light-polarizing film of the present invention thus obtained is very superior in heat stability to a conventional polyene-containing light-polarizing film containing no acrylate or methacrylate polymer. That is, the light-polarizing film of the present invention can be used for a long time under dry or wet heating conditions such as at 40° to 80° C. with minimum change of polarization efficiency and color (hue and density). Accordingly, the light-polarizing film of the present invention can be used without any trouble even if in a field where any light-polarizing film (or a device using a light-polarizing film) hitherto could not be used due to a high temperature and humidity.

Moreover, the light-polarizing film of the present invention is superior in transparency and physical properties to a conventional light-polarizing film composed only by a polyene-containing halogenated vinyl or vinylidene polymer since the film of the present invention contains an acrylate or methacrylate polymer having good transparency.

From the above characteristics, the light-polarizing film of the present invention can be used in various fields such as liquid crystal display devices, various optical devices or apparatuses, light-filters in photography, sun glasses, sunvisors and the like.

In practice, the light-polarizing film of the present invention may be laminated with a protective transparent plastic or glass in order to protect from a light. Particularly, when the film is used in the open air or in a liquid crystal device, it is preferable to laminate a filter which cuts off the light of under 430 mµ since specific superior light resistance is required.

As far as optical uniformity is maintained, the above filter to be laminated may be any layer or film which can be formed on the surface of the light-polarizing film of the present invention, for example, a protective plastic plate or film which is formed on the light-polarizing film, a coating later which is coated on the light-polarizing film or an adhesive layer which is provided between a protective film and the light-polarizing film. As a base material of the layer or film, various general purpose polymers, preferably, those having superior transparency such as cellulose acetate, cellulose butyrate, cellulose acetate butyrate, polycarbonate and polyvinyl acrylate can be used. Also, a urethane resin, an epoxy resin, polybutyl acrylate or polybutyl methacrylate can be used as the adhesive for the laminating.

Such a protective filter can be prepared from the above polymer in the following manner. A film or sheet formed from the base polymer is treated in a mixture of a yellow dye having a maximum light absorption around 400 mµ and a UV absorber at a temperature of from room temperature to the softening point of the polymer for several seconds to several ten minutes, washed with water (or the solvent is removed), and then air-dried. Alternatively, a mixture of the polymer, the above yellow dye and the UV absorber may be formed into a film or a sheet, or mixture may be coated on the surface of the light-polarizing film to form a coating film. Further, the yellow dye and the UV absorber may be admixed in the above adhesive between the light-polarizing film and a protective film thereon. Examples of the yellow dye having a maximum light absorption around 400 mµ are a disperse dye such as C.I. Disperse Yellow 5, C.I. Disperse Yellow 8 and the like and an acidic dye such as C.I. Direct Yellow 29, C.I. Direct Yellow 69 and the like Examples of the UV absorber are 2,2'-dimethoxybenzophenone, 2,2',4,4'-tetrahydroxybenzophenone, 2-(2-hydroxy-5-methylphenyl)-benzotriazole and the like. When the above polymer is treated in the form of a film or a sheet, a mixture comprising 0.1 to 5 part by weight of the yellow dye and 0.1 to 10 part by weight of the UV absorber per 100 part by weight of a solvent (e.g. methyl ethyl ketone, ethyl acetate etc.) is preferbly used for the treatment. When a mixture of the polymer, the yellow dye and the UV absorber is formed into a film or is coated on the light-polarizing film, suitable amount of the yellow dye is in the range of 0.05 to 5 parts by weight per 100 parts by weight of the polymer, although it varies with the thickness of the film or coating film to be formed or the adhesive layer.

The filter thus obtained may be provided on the both surfaces of the light-polarizing film of the present invention, but, usually, it is sufficient to provide it on either surface of the light-polarizing film. The light-polarizing film laminated with the filter can be used in such a manner as incident light can reach the light-polarizing film through the filter.

The following examples illustrate the present invention wherein the parts are by weight. In the examples, heat stability of the light-polarizing film is evaluated by the degree of (1) change in light transmittance (k) at the wavelength of 590 mµ; (2) change in the maximum absorption wavelength ($\lambda$ max); and (3) change in the difference between $H_0$ and $H_{90}$ ($\Delta H = H_0 - H_{90}$) at the wavelength of 400 to 700 mµ (calculated from $H_0$ and $H_{90}$ measured within the wavelength range at intervals of 10 mµ) before and after a continuous use of the film under dry heating conditions (the degree of these changes is smaller, the change in polarization efficiency is lesser and the change in color is also lesser).

The light transmittance was measured with respect to a sheet of the sample film by Beckman DB-G photoelectric spectrophotometer according to the standard method.

EXAMPLE 1

A commercially available polyvinyl chloride (4 parts, average polymerization degree: 1,800) was dissolved in dimethylformamide (25 parts). To this solution was added trimethylamine (0.7 part) and reacted at 80° C. for 200 minutes. After the completion of the reaction, a commercially available polymethyl methacrylate (2 parts, average polymerization degree: 1,800) was added to the reaction mixture. The resulting solution was cast on a glass plate and treated at 80° C. for 5 hours to evapolate the solvent to obtain a transparent film of 30µ in thickness. The film was heated at 90° C. for 15 hours to obtain a bluish violet transparent film. The film was stretched 5.5 times the length in one direction to obtain a light-polarizing film. For a comparative purpose, a light-polarizing film was prepared according to the same procedure except that polyvinyl chloride (2 parts) was substituted for the polymethyl methacrylate (comparative example).

These light-polarizing films were treated by dry heating at 70° C. for 3 days. The change in optical properties of the each film is shown in Table 1.

TABLE 1

| Sample | Before heat treatment ||| After heat treatment |||
|---|---|---|---|---|---|---|
| | k (%) | $\lambda$max (mµ) | Average $\Delta H$ (%) | k (%) | $\lambda$max (mµ) | Average $\Delta H$ (%) |
| Example 1 | 55 | 590 | 12 | 54 | 585 | 12 |
| Comparative Example | 56 | 590 | 11 | 35 | 555 | 6 |

EXAMPLE 2

A commercially available polyvinylchloride (5 parts, average polymerization degree: 2,500) was dissolved in a mixed solvent of dimethylformamide (15 parts) and tetrahydrofuran (15 parts). To this solution was added 1,8-diazabicyclo[5.4.0]undecene-7 (0.05 part) and partially dehydrohalogenated at 60° C. for 30 minutes.

Separately, a commercially available polymethyl methacrylate (5 parts, average polymerization degree: 1,800) was dissolved in a mixed solvent of dimethylformamide (15 parts) and tetrahydrofuran (15 parts).

The solution of polymethyl methacrylate (PMMA) and the above prepared reaction mixture was mixed in various ratios and further added thereto a mixed solvent of dimethylformamide and tetrahydrofuranone (1:1) in such an amount as the solid content of the mixture is 5% by weight. The mixture was cast on a glass plate and evapolated the solvent to obtain a yellow transparent film of 40μ in thickness. The film was heated at 90° C. for 1 hour to obtain a bluish violet transparent film. The film was then stretched 6 times the length in one direction at 110° C. to obtain valious light-polarizing films.

The above obtained 6 light-polarizing films of various PMMA contents were treated by dry heating at 70° C. for 3 days. The change in optical properties of the each film is shown in Table 2.

TABLE 2

| PMMA content (wt %) | Before heat treatment | | | After heat treatment | | |
|---|---|---|---|---|---|---|
| | k (%) | λmax (mμ) | Average ΔH (%) | k (%) | λmax (mμ) | Average ΔH (%) |
| 0 | 57 | 590 | 10 | 31 | 555 | 4 |
| 10 | 56 | 590 | 11 | 54 | 580 | 10 |
| 20 | 57 | 590 | 10 | 55 | 580 | 9 |
| 30 | 58 | 590 | 10 | 56 | 585 | 10 |
| 90 | 59 | 590 | 11 | 57 | 585 | 10 |
| 95 | 56 | 590 | 9 | 55 | 585 | 9 |

EXAMPLE 3

A solution of partially dehydrohalogenated polyvinyl chloride prepared by the same procedure in Example 2 was mixed with a solution of various polyalkyl methacrylates (the concentration and the solvent are the same as those of PMMA solution in Example 2) in such a ratio as the amount of the polyalkyl methacrylate is 20% by weight based on the total amount of the resins in the mixture obtained. The mixture was cast on a glass plate and evapolated the solvent to obtain a film of 50μ in thickness. The film was heated at 90° C. for 2 hours. The bluish violet film thus obtained was then stretched 5.5 times the length in one direction at 110° C. to obtain valious light-polarizing films.

The above obtained light-polarizing films containing various polyalkyl methacrylates and a light-polarizing film prepared for a comparative purpose by the same procedure without addition of any polyalkyl methacrylate were treated by dry heating at 70° C. for 3 days. The change in optical properties of the each film is shown in Table 3. The alphabetical numbers of the polymers in Table 3 mean as follows (the number in parenthesis are molar ratios of copolymerization):

A: polyethyl methacrylate,
B: polybutyl methacrylate,
C: copoly(methyl methacrylate-ethyl methacrylate) (70/30),
D: copoly(methyl methacrylate-methyl acrylate) (80/20), and
E: copoly(methyl methacrylate-ethyl acrylate) (60/40).

TABLE 3

| Polymer added | Before heat treatment | | | After heat treatment | | |
|---|---|---|---|---|---|---|
| | k (%) | λmax (mμ) | Average ΔH (%) | k (%) | λmax (mμ) | Average ΔH (%) |
| Non | 52 | 590 | 8 | 23 | 555 | 3 |
| A | 52 | 590 | 9 | 47 | 585 | 9 |
| B | 54 | 590 | 11 | 49 | 580 | 10 |
| C | 53 | 590 | 10 | 51 | 585 | 9 |
| D | 50 | 590 | 8 | 47 | 585 | 8 |
| E | 51 | 590 | 9 | 48 | 585 | 9 |

EXAMPLE 4

A commercially available polyvinyl chloride (5 parts, average polymerization degree: 2,500) was dissolved in a mixed solvent of dimethylformamide (15 parts) and tetrahydrofuran (15 parts). To this solution was added 1.8-diazabicyclo[5.4.0]undecene-7 (0.05 part) and partially dehydrohalogenated at 60° C. for 30 minutes.

Separately, polyisobornyl methacrylate (5 parts, average polymerization degree: 1,500) was dissolved in a mixed solvent of dimethylformamide (15 parts) and tetrahydrofuran (15 parts).

The above prepared reaction mixture and the solution of polyisobornyl methacrylate (PIBA) was mixed in the weight ratio of solid content of 8/2 and further added thereto a mixed solvent of dimethylformamide and tetrahydrofuran (1:1) in such an amount as the solid content of the mixture is 1% by weight. The mixture was cast on a glass plate and evapolated the solvent to obtain a yellow transparent film of 40μ in thickness. The film was heated at 90° C. for 70 minutes to obtain a bluish violet transparent film. The film was then stretched 6 times the length in one direction at 110° C. to obtain a light-polarizing film.

The light-polarizing film was treated by dry heating at 70° C. for 5 days. The change in optical properties of the film is shown in Table 4.

TABLE 4

| PIBA content (wt %) | Before heat treatment | | | After heat treatment | | | Color difference (ΔE) |
|---|---|---|---|---|---|---|---|
| | k (%) | λmax (mμ) | Average ΔH (%) | k (%) | λmax (mμ) | Average ΔH (%) | |
| 0 | 51 | 590 | 11 | 29 | 555 | 5 | 8.0 |
| 20 | 50 | 590 | 11 | 49 | 580 | 11 | 1.3 |

What is claimed is:

1. A light-polarizing film comprising a polymer mixture of (a) a polymer having polyene chains formed by partial dehydrohalogenation of a halogenated vinyl polymer or a halogenated vinylidene polymer and (b) at least one polymer selected from the group consisting of acrylate polymers and methacrylate polymers; said film having said polyene chains oriented by stretching at least 1.2 times its length and said film having substantially improved heat stability as compared to a similar film absent (b).

2. A light-polarizing film according to claim 1 where the mixture contains 5 to 95% by weight of the partially dehydrohalogenated halogenated vinyl or vinylidene polymer and 5 to 95% by weight of the acrylate or methacrylate polymer.

3. A light-polarizing film according to claim 1, wherein the film has 10 to 70% of average light transmittance at the wavelength of 450 to 700 mμ and the ratio of average percent light transmitted with the polarization axes parallel ($H_0$) to average percent light transmitted with the polarization axes crossed ($H_{90}$) of the film is $H_0/H_{90} \geq 2$.

4. A light-polarizing film according to claim 3, wherein the film has 20 to 70% of average light transmittance at the wavelength of 450 to 700 mμ and the ratio of average percent light transmitted with the polarization axes parallel ($H_0$) to average percent light transmitted with the polarization axes crossed ($H_{90}$) of the film is $H_0/H_{90} \geq 4$.

5. A light-polarizing film according to claim 1, wherein the acrylate or methacrylate polymer is a homopolymer or a copolymer of a monomer of the formula:

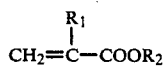

in which $R_1$ is hydrogen or an alkyl group having 1 to 10 carbon atoms; and $R_2$ is an alkyl group, a halosubstituted alkyl group or an alkyl group whose chain is interrupted with O, N, or S, each alkyl group having 1 to 10 carbon atoms, a cycloalkyl or bicycloalkyl group having 5 to 10 carbon atoms, an aryl group or halosubstituted aryl group having 6 to 10 carbon atoms, an aralkyl group having 7 to 10 carbon atoms or a heterocyclic group containing one or more hetero atom selected from O, N and S.

6. A light-polarizing film according to claim 1, wherein the acrylate or methacrylate polymer is a copolymer of a monomer of the formula:

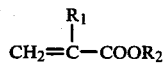

in which $R_1$ is hydrogen or an alkyl having 1 to 10 carbon atoms; and $R_2$ is an alkyl group, a halosubstituted alkyl group or an alkyl group whose chain is interrupted with O, N, or S, each alkyl group having 1 to 10 carbon atoms, a cycloalkyl or bicycloalkyl group having 5 to 10 carbon atoms, an aryl group or halosubstituted aryl group having 6 to 10 carbon atoms, an aralkyl group having 7 to 10 carbon atoms or a heterocyclic group containing one or more hetero atom selected from O, N and S; said copolymer containing up to 50 mol % based on all the structural units of the polymer of another copolymerized copolymerizable monomer of the formula:

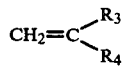

in which $R_3$ is hydrogen or an alkyl having 1 to 10 carbon atoms; and $R_4$ is a hydrocarbon group a hydroxyl or halosubstituted hydrocarbon group, or hydrocarbon group or a hydrocarbon group containing an alkyl chain interrupted with O, N, S, or —COO— atoms, a heterocyclic group having at least one hetero atom selected from O, N and S; —CN, —OH or —OOCR$_5$; $R_5$ is alkyl group or an alkyl group interrupted with O, N, S or —COO—, each having 1 to 10 carbon atoms.

7. A light-polarizing film according to claim 1, wherein the dehydrohalogenation degree of the hydrohalogenated vinyl or vinylidene polymer is 0.1 to 30 mol %.

8. A light-polarizing film according to claim 1, wherein the halogenated vinyl or vinylidene polymer is a homopolymer or a copolymer of a monomer of the formula;

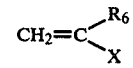

in which X is a halogen; $R_6$ is hydrogen, —CN, —COOR$_7$, —OOCR$_8$ or an aryl having 6 to 10 carbon atoms; $R_7$ is an alkyl having 1 to 10 carbon atoms; $R_8$ is an alkyl having 1 to 10 carbon atoms, an aryl having 6 to 10 carbon atoms or a cycloalkyl having 5 to 10 carbon atoms.

9. A light-polarizing film according to claim 8, wherein said polymer is polyvinyl chloride.

10. A light-polarizing film according to claim 1, wherein the halogenated vinyl or vinylidene polymer is a block or graft copolymer of a monomer of the formula:

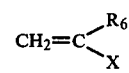

in which X is a halogen; $R_6$ is hydrogen, —CN, —COOR$_7$, —OOCR$_8$ or an aryl having 6 to 10 carbon atoms: $R_7$ is an alkyl having 1 to 10 carbon atoms; $R_8$ is an alkyl having 1 to 10 carbon atoms, an aryl having 6 to 10 carbon atoms or a cycloalkyl having 5 to 10 carbon atoms and up to 90 mol % based on all the structural units of the polymer of another copolymerizable monomer of the formula:

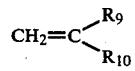

in which $R_9$ is hydrogen or an alkyl having 1 to 10 carbon atoms; $R_{10}$ is hydrogen, a hydrocarbon group or halosubstituted hydrocarbon group having 1 to 10 carbon atom, a heterocyclic group having at least one hetero atoms selected from O, N and S; —CN, —COOR$_{11}$, —OOCR$_{12}$, or —OH; $R_{11}$ is hydrogen, an alkyl group or an alkyl group interrupted by O, N or S, each having 1 to 10 carbon atoms; $R_{12}$ is an alkyl group or an alkyl group interrupted by O, N or S, each having 1 to 10 carbon atoms, an aryl having 6 to 10 carbon atoms or a cycloalkyl having 5 to 10 carbon atoms.

11. The film of claim 5 wherein $R_2$ is alkyl or aryl.
12. The film of claim 6 wherein $R_2$ is alkyl or aryl.
13. The film of claim 12 wherein $R_4$ and $R_5$ are alkyl.
14. The film of claim 10 wherein $R_{11}$ and $R_{12}$ are alkyl.

* * * * *